United States Patent [19]

Hornback et al.

[11] Patent Number: 5,188,775
[45] Date of Patent: Feb. 23, 1993

[54] METHOD AND APPARATUS FOR SHRINKING A FOAM SLEEVE ON A TAPER WALL CONTAINER

[75] Inventors: Roger W. Hornback, New Haven, Ky.; John E. Burtch, Curtice, Ohio

[73] Assignee: Owens-Illinois Plastic Products Inc., Toledo, Ohio

[21] Appl. No.: 759,185

[22] Filed: Sep. 10, 1991

Related U.S. Application Data

[63] Continuation of Ser. No. 583,540, Sep. 17, 1990, abandoned.

[51] Int. Cl.⁵ .............................................. B29C 61/02
[52] U.S. Cl. ........................................ 264/25; 34/105; 156/86; 156/380.9; 156/497; 219/388; 264/230; 264/DIG. 71; 392/416; 392/418; 432/124; 432/224; 432/225
[58] Field of Search .................. 264/230, DIG. 71, 25; 432/124, 224, 225; 156/86, 380.9, 497; 34/105; 219/388, 400; 392/416, 418

[56] References Cited

U.S. PATENT DOCUMENTS

| | | |
|---|---|---|
| 3,226,278 | 12/1965 | Scofield, Sr. et al. ............... 156/497 |
| 3,808,702 | 5/1974 | Laessig ................................ 34/105 |
| 3,847,540 | 11/1974 | Farfaglia et al. ..................... 156/497 |
| 4,066,866 | 1/1978 | Fresnel ................................. 156/86 |
| 4,092,382 | 5/1978 | Heckman et al. ..................... 264/25 |
| 4,172,873 | 10/1979 | Spicer ................................... 264/230 |
| 4,260,567 | 4/1981 | Poppe et al. .......................... 264/25 |
| 4,579,614 | 4/1986 | Burmeister et al. .................. 156/86 |

Primary Examiner—Jan H. Silbaugh
Assistant Examiner—Brian J. Eastley

[57] ABSTRACT

A method of shrinking a foamed sleeve onto a tapered wall container which includes moving containers through a predetermined path, subjecting the containers to infrared heat applied by directing air past infrared heaters against the containers as they are moved in the predetermined path and progressively applying additional heat to the containers as they are moved in the predetermined path by first directing heat at the maximum container diameter and progressively applying the heat toward the minimum container diameter. In a preferred form, the heat is applied by directing heated air against the containers. In one form, the containers are rotated progressively in the predetermined path while the additional heat is applied. In another form, the containers are moved without rotation in a predetermined path while the additional heat is applied along the sides of the path.

7 Claims, 3 Drawing Sheets

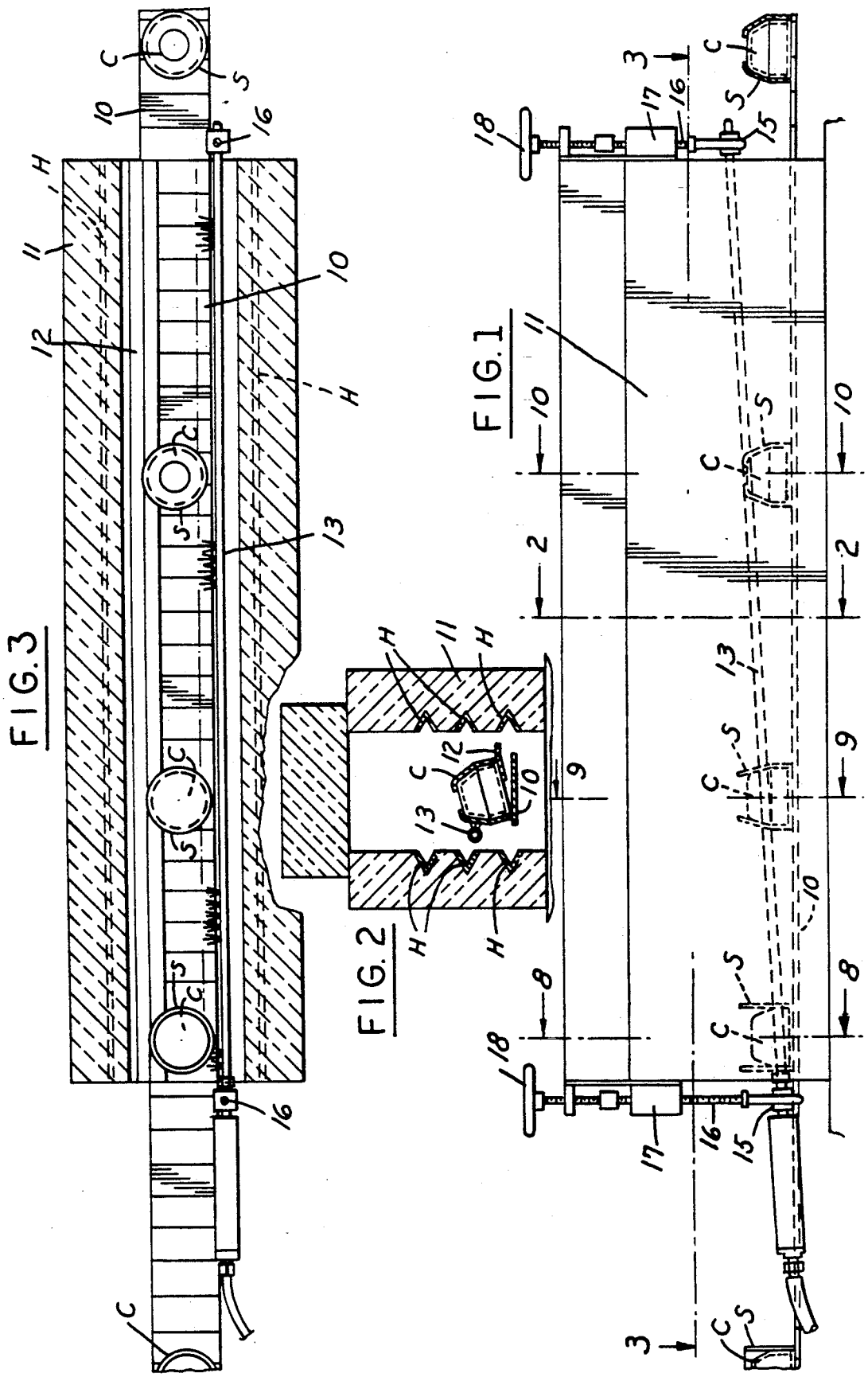

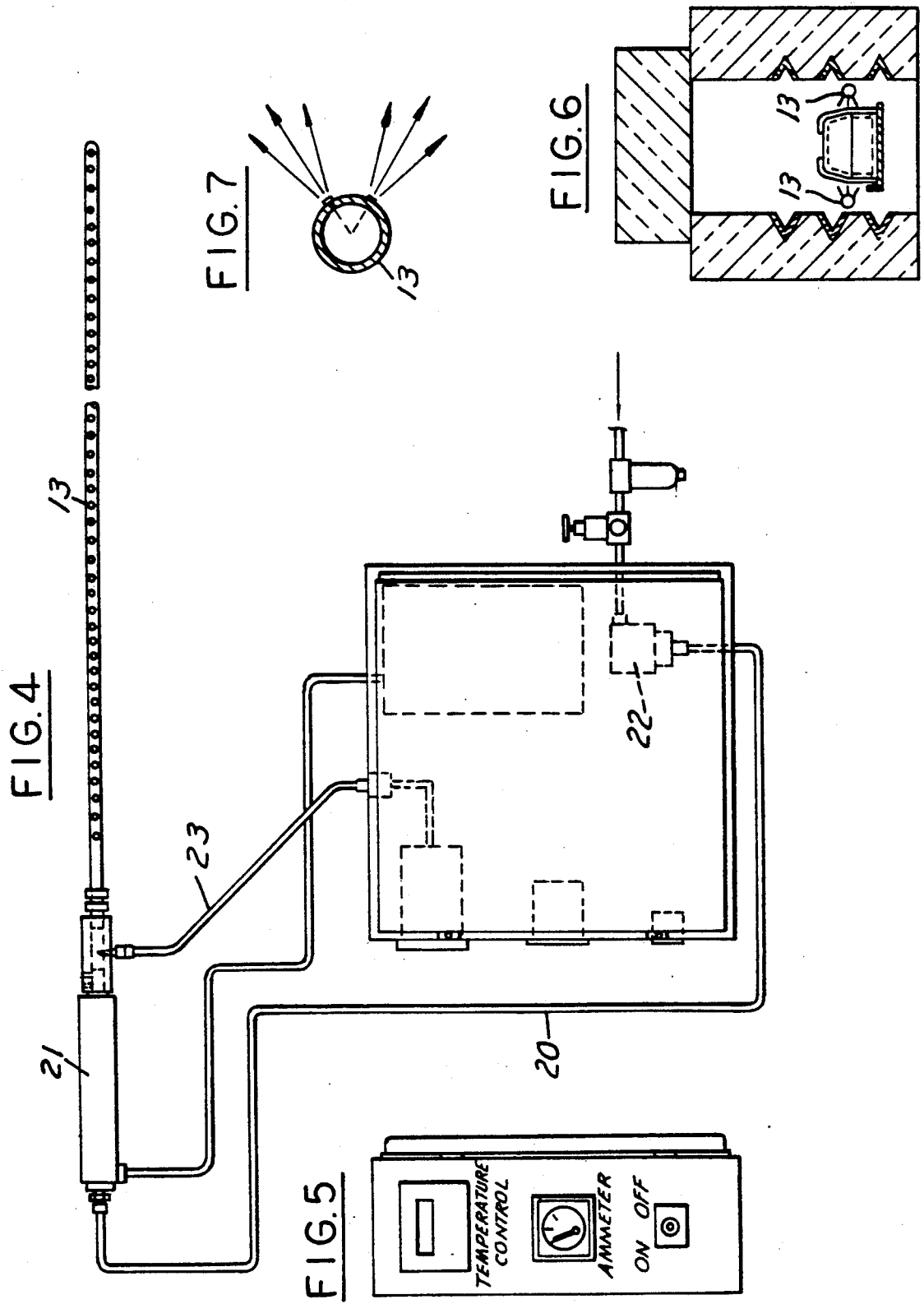

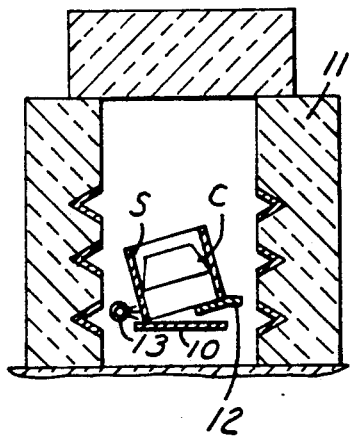
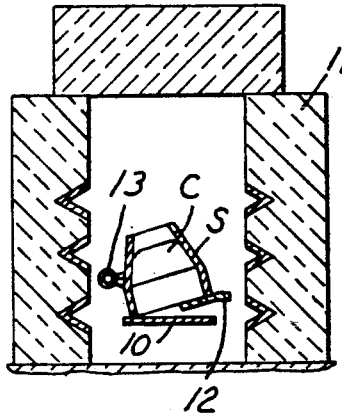
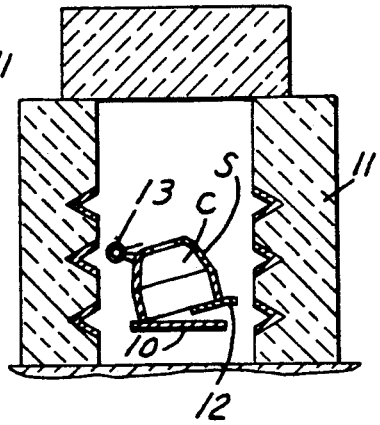
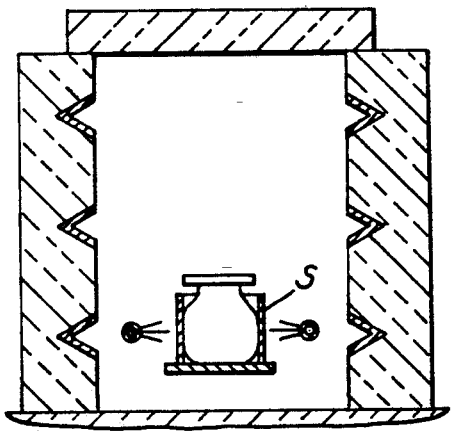
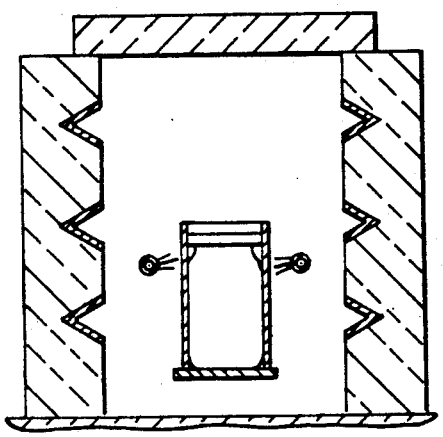
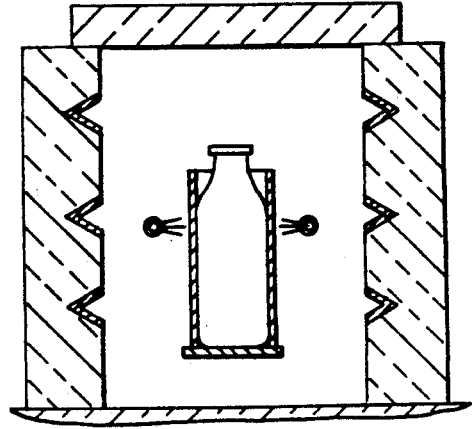

METHOD AND APPARATUS FOR SHRINKING A FOAM SLEEVE ON A TAPER WALL CONTAINER

This is a continuation of copending application Ser. No. 07/583,540 filed on Sep. 17, 1990, now abandoned.

This invention relates to the application of foamed sleeves or labels on a tapered wall container and particularly to the shrinkage of such a sleeve after it has been applied.

BACKGROUND OF THE INVENTION

It is common in food and drink packages to apply a printed polystyrene foam on the container and thereafter shrink the foam into contact with portions of the container in order that the label will conform to the contour of the container.

For example, in food packaging which is intended for reheating in a microwave oven, a tapered wall thermoformed plastic cup is filled with food and a sleeve is applied thereto about the periphery to serve as a label to identify the product and manufacturer and to serve as an insulator to permit handling of the cup and its contents after microwave heating. The foam label may be applied in the form of a previously made sleeve or by feeding a continuous sheet of web equal in width to the desired width of the label, cutting off a rectangular blank with a length sufficient to wrap fully around the cup and providing an overlapped seal to form a cylindrical sleeve equal in diameter to the maximum diameter of the cup. The sleeve may be attached by wrapping the blank about the cup utilizing heat seals, solvent seals, or adhesive. The cup with the sleeve thereon is then conveyed with or without rotation in an inverted position with the larger diameter facing downwardly through a heated oven which shrinks the foam label sleeve to the tapered contour of the cup and, in some instances, about a portion of the bottom of the cup. Such ovens conventionally employ strip infrared heaters extending along the side walls of the interior of the oven. Where the containers have large changes in diameter along their height, such as in a cup, in such arrangements, it is difficult to provide proper heat and to adjust the heat as may be required. Inasmuch as the cup is conveyed through the oven with the bottom up, the bottom is subjected to the upper part of the oven which is hotter. Also, the cylinder formed by the sleeve around the cup is further away from the lower portion of the cup due to the contoured shape. As a result, the foam material shrinks faster around the bottom of the cup entrapping air between the foam sleeve and the upper part of the cup. The effect of this is that the foam label does not fully conform to the contour of the cup and irregular air pockets are provided producing a wrinkled or puckered appearance.

SUMMARY OF THE INVENTION

Among the objectives of the present invention are to provide a method and apparatus which will provide for proper heating to avoid irregular air pockets; wherein the method and apparatus can be readily adjusted; wherein heat is progressively applied initially from the area of maximum diameter of the cup and progressively toward the bottom thereby causing the shrinkage to occur uniformly and smoothly pushing any air between the cup and label outwardly, avoiding entrapment of air and resulting in a proper conformation and matching of the label to the cup.

In accordance with the invention, a method of shrinking a foamed sleeve onto a tapered wall container which comprises moving containers through a predetermined path, subjecting the containers to infrared heat applied by directing air past infrared heaters against the containers as they are moved in the predetermined path and progressively applying additional heat to the containers as they are moved in the predetermined path by first directing heat at the maximum container diameter and progressively applying the heat toward the minimum container diameter. In a preferred form, the heat is applied by directing heated air against the containers. In one form, the containers are rotated progressively in the predetermined path while heat is applied. In another form, the containers are moved without rotation in the predetermined path while the additional heat is applied along the sides of the path.

DESCRIPTION OF THE DRAWINGS

FIG. 1 is a partly diagrammatic side elevational view of an apparatus embodying the invention.

FIG. 2 is a fragmentary sectional view taken along the line 2—2 in FIG. 1.

FIG. 3 is a fragmentary sectional view taken along the line 3—3 in FIG. 1.

FIG. 4 is a schematic view of the control mechanism.

FIG. 5 is an end view of a portion of the control mechanism.

FIG. 6 is a sectional view of a modified form of the invention.

FIG. 7 is a sectional view of a portion of the apparatus shown in FIG. 6.

FIG. 8 is a sectional view taken along the line 8—8 in FIG. 1.

FIG. 9 is a sectional view taken along the line 9—9 in FIG. 1.

FIG. 10 is a sectional view taken along the line 10—10 in FIG. 1.

FIG. 11 is a sectional view similar to FIG. 6 showing a sleeve being applied to a container.

FIGS. 12 and 13 are sectional views showing a sleeve being applied to other types of containers.

DESCRIPTION

In accordance with the invention, the method of shrinking a foamed sleeve onto a tapered wall container comprises moving containers through a predetermined path, subjecting the containers to infrared heat applied by directing air past infrared heaters against the containers as they are moved in the predetermined path and progressively applying heat to the containers as they are moved in the predetermined path by first directing heat at the maximum container diameter and progressively applying the heat toward the minimum container diameter. In a preferred form, the heat is applied by directing heated air against the containers. In one form, the container is rotated progressively in a predetermined path while the additional heat is applied. In another form, the containers are moved without rotation in a predetermined path while the additional heat is applied along the sides of the path.

Referring to FIGS. 1-4, an apparatus for performing the invention comprises a conveyor 10 having a portion thereof passing through heated oven 11 which includes infrared heaters extending longitudinally of the oven 11 and directed on the containers as they are moved through the oven. The conveyor 10 supports a series of inverted filled containers C, herein shown as thermoplastic cups that have tapering side walls that are convex and have a sleeve S applied thereto prior to movement through the oven. The oven includes a ramp 12 extending longitudinally thereof and holding each cup C at an angle, as shown in FIG. 2, such that as the cup is moved through the oven by the conveyor 10 it is rotated.

A hot air pipe 13 extends longitudinally on the interior of the oven and has a plurality of orifices 14 which direct additional heated air against the container. The pipe 13 is supported by adjustable supports, as presently described, at each end so that the angle of the pipe with respect to the cup can be changed. The pipe 13 is adjusted such that the heat is initially directed against the portion of the container with the larger diameter and inclined upwardly and rearwardly with respect to the direction and movement of the conveyor 10 toward the rear of the conveyor so that the heat is progressively applied along the tapered portion and along the bottom portion to progressively shrink the sleeve onto the container without wrinkling or entrapping of air.

Referring specifically to FIG. 1, each of the adjustment supports comprises a journal 15 fixed on a screw 16 that is threaded in a block 17 and may be grasped by a hand wheel 18 to vertically adjust the end of the pipe.

Referring to FIG. 4, which shows a control mechanism for the hot air pipe 13, air is supplied from a source through a pipe 20 to the pipe 13. An electric heater 21 surrounds the pipe and functions to heat the air before it passes to the pipe. A pressure switch 22 is operable to maintain a predetermined pressure in the pipe and a thermocouple 23 controls the temperature of the heater 21.

In operation, a foamed shrinkable sleeve is applied to each container and the container is moved along through heated oven 11 by conveyor 10. The foamed shrinkable sleeve may comprise, for example, a coextruded multilayer sheet, such as shown in U.S. Pat. No. 4,626,455, incorporated herein by reference. The container is thus heated by the infrared heaters in the oven and is also progressively heated by the heated air from the pipe 13 as it is moved in a predetermined path by first directing heat at the maximum container diameter and progressively applying the heat toward the minimum container diameter, as shown in FIGS. 8, 2 and 10. The heat is applied by directing heated air against the container progressively from the area of largest diameter along the body of the container and along the tapered portion of the container. The container is rotated progressively in a predetermined path by ramp 12. It has been found that the temperature of the heated air is preferably greater than the temperature of the infrared heaters.

In a typical example, the pipe had a nominal diameter of ½ inch, the orifices had a diameter of 0.060 inch and were on ½ inch centers. The heated air was heated to 700° F., while the three rows of infrared heaters had temperatures of 640° F. for the top row, 660° F. for the middle row, and 595° F. for the bottom row.

In the form shown in FIGS. 6 and 7, the container is larger and a pair of inclined pipes 13a are provided, one on each side of the container. The container is moved without rotation in a predetermined path through the heated oven as the additional heat is applied by the pipes 13a.

In the form shown in FIG. 11, the container has tapered upper and lower surfaces. The pipes 13 are provided in a manner similar to FIG. 6 except that the ends of the pipes at the inlet to the oven are lowered to direct heat adjacent the sleeve at the lower tapered surfaces and the pipes are inclined toward the other end of the oven to direct the air progressively over the sleeve and finally over the portion of the sleeve adjacent the upper tapered surface.

In the form of containers shown in FIGS. 12 and 13, the pipes are similarly positioned so that they extend from the lower end of the sleeve and are inclined upwardly toward and adjacent the tapered surface.

It can thus be seen that there has been provided a method and apparatus which will provide for proper heating to avoid irregular air pockets; wherein the method and apparatus can be readily adjusted; wherein heat is progressively applied initially from the area of maximum diameter of the cup and progressively toward the bottom thereby causing the shrinkage to occur uniformly and smoothly pushing any air between the cup and label outwardly, avoiding entrapment of air and resulting in a proper conformation and matching of the label to the cup.

We claim:

1. A method of shrinking foamed sleeves onto containers, each container having a body which includes a body portion and a tapered portion that progressively decreases in diameter which comprises applying a sleeve of shrinkable material to successive containers such that a portion of each said sleeve surrounds the body portion and another portion of said sleeve is spaced from said tapered portion of said container, progressively moving said containers with sleeves thereon by a conveyor through a heated oven having two rows of infrared heaters associated therewith along the sides of the oven to direct infrared heat onto the sides of the containers as they are moved through the oven, positioning a pipe having longitudinally spaced orifices along the length thereof in at least a portion of said oven between at least one row of said infrared heaters and the path of said containers, such that the orifices face the containers as the containers are moved through the oven; the end of said pipe adjacent the inlet of the containers to the oven is adjacent the body portion of the container having the largest diameter as the containers are moved adjacent thereto; the pipe is inclined in the direction of travel such that the orifices at the other end of the pipe are adjacent the portion of the sleeve spaced from the tapered portion of the container as the containers are moved adjacent thereto; and the orifices progressively face the containers as they are moved alongside the pipe, providing a source of air under pressure separate from the atmosphere of said oven, heating said air from said source to provide heated air under pressure, applying said heated air under pressure to the pipe such that the heated air emanates from said orifices; and such that the infrared heaters direct radiation against said containers; and said pipe simultaneously directs heated air onto each said container having a sleeve thereon as it is moved through the oven such that heated air under pressure from said orifices is first directed at the sleeve adjacent the body portion of the container and heated air from said orifices is thereupon progressively directed toward the sleeve adjacent the tapered portion of the container thereby causing the shrinkage to occur uniformly and smoothly from the body portion of the container and progressively along the tapered portion so that the sleeve smoothly conforms with the body portion and tapered portion.

2. The method set forth in claim 1 including the steps of positioning a second pipe having orifices along the other side of the path of the containers, positioning said second pipe having longitudinally spaced orifices along the length thereof in at least a portion of said oven between said other row of infrared heaters and the path of said containers, such that the orifices face the containers as the containers are moved through the oven; the end of said second pipe adjacent the inlet of the containers to the oven is adjacent the body portion of the container having the largest diameter as the containers are moved adjacent thereto; the second pipe is inclined in the direction of travel such that the other orifices at the other end of the second pipe are adjacent the portion of the sleeve spaced from the tapered portion of the container as the containers are moved adjacent thereto; and the orifices progressively face the containers as they are moved alongside the pipe, applying said heated air under pressure to the second pipe such that the heated air emanates from said orifices and such that the infrared heaters direct radiation against said containers and said second pipe simultaneously directs heated air onto each said container having a sleeve thereon as it is moved through the oven such that heated air from said orifices in said second pipe is first directed at the sleeve adjacent the body portion of the container and heated air from said orifices on said second pipe is thereon progressively directed toward the sleeve adjacent the tapered portion of the container thereby causing the shrinkage to occur uniformly and smoothly from the body portion of the container and progressively along the tapered portion so that the sleeve smoothly conforms with the body portion and tapered portion.

3. The method set forth in claim 1 including the step of positioning means within said infrared oven for rotating each said container as it is moved by said conveyor past said orifices in said pipe.

4. The method set forth in any one of claims 1-3 including the step of controlling the temperature of the heated air supplied to said pipe such that it is greater than the temperature to which the oven is heated by the infrared heaters.

5. An apparatus for shrinking foamed sleeves about containers, each container having a body which includes a body portion and a tapered portion that progressively decreases in diameter comprising an oven having two rows of infrared heaters extending longitudinally thereof, a conveyor for moving said containers having sleeves applied thereto progressively through said oven along the sides of the oven to direct infrared heat onto the sides of the containers as they are moved through the oven, a pipe having longitudinally spaced orifices therein, means for supplying heated air to said pipe such that the heated air flows through said orifices, said means for supplying heated air comprising a source of air under pressure separate from the atmosphere in said oven, heating means for heating said air under pressure and supplying said heated air under pressure directly to said pipe, means for adjustably mounting said pipe in said oven between at least one row of said infrared heaters and the path of said containers, said means for adjustable mounting said pipe being such that said pipe is positioned and such that the infrared heaters direct radiation against said containers and said pipe simultaneously directs heated air at an angle to the conveyor extending longitudinally such that the heated air emanating from said orifices is first directed onto the body portion of the container as the containers are moved adjacent to the orifices; and heated air from said orifices under pressure is progressively applied toward the sleeve on the tapered portion of each container as it is moved through the oven adjacent to the orifices; and the orifices progressively face the containers as they are moved alongside the pipe thereby causing the shrinkage to occur uniformly and smoothly from the body portion and progressively along the tapered portion so that the sleeve conforms with the body portion and tapered portion.

6. The apparatus set forth in claim 5 including a second pipe having longitudinally spaced orifices therein, means for applying heated air under pressure to said second pipe such that the heated air emanates from said orifices, and means for adjustably mounting said second pipe in said oven between said infrared heaters and the path of said containers, such that the infrared heaters direct radiation against said containers and said pipe simultaneously directs heated air, said means for adjustably mounting said pipe being such that said pipe is positioned and such that the infrared heaters direct radiation against said containers and said pipe simultaneously directs heated air that it is at an angle to the conveyor extending longitudinally such that the heated air emanating from said orifices progressively applies heated air under pressure to the body portion of the container as the containers are moved adjacent to the orifices; and thereafter heated air is applied toward the sleeve adjacent to the tapered portion of each container as each container is moved through the oven as the containers are moved adjacent to the orifices; and the orifices progressively face the containers as they are moved alongside the pipe thereby causing the shrinkage to occur uniformly and smoothly from the body portion and progressively along the tapered portion so that the sleeve conforms with the body portion and tapered portion.

7. The apparatus set forth in claim 5 including means positioned along said conveyor for rotating said containers as the conveyor moves the containers successively through at least the portion of said oven having said pipe therein.

* * * * *